(12) United States Patent
Berghorst et al.

(10) Patent No.: US 8,651,151 B2
(45) Date of Patent: Feb. 18, 2014

(54) FUEL SHUT-OFF VALVE ASSEMBLIES AND METHODS OF MAKING AND ASSEMBLING THE SAME

(75) Inventors: William Berghorst, Zeeland, MI (US); Kirk J. Bush, Holland, MI (US); Franco A. Cisternino, Deerfield, IL (US); Michael Payne, Grand Haven, MI (US)

(73) Assignee: Illinois Tool Works Inc., Glenview, IL (US)

( * ) Notice: Subject to any disclaimer, the term of this patent is extended or adjusted under 35 U.S.C. 154(b) by 852 days.

(21) Appl. No.: 12/593,078

(22) PCT Filed: Mar. 25, 2008

(86) PCT No.: PCT/US2008/058105
§ 371 (c)(1), (2), (4) Date: Sep. 25, 2009

(87) PCT Pub. No.: WO2008/121605
PCT Pub. Date: Oct. 9, 2008

(65) Prior Publication Data
US 2010/0126625 A1  May 27, 2010

Related U.S. Application Data

(63) Continuation-in-part of application No. 10/976,709, filed on Oct. 29, 2004, now Pat. No. 7,549,443.

(60) Provisional application No. 60/920,615, filed on Mar. 29, 2007, provisional application No. 60/528,037, filed on Dec. 9, 2003, provisional application No. 60/557,182, filed on Mar. 29, 2004, provisional application No. 60/582,380, filed on Jun. 26, 2004.

(51) Int. Cl.
*B65B 1/04* (2006.01)
*B65B 3/00* (2006.01)
*B67C 3/00* (2006.01)

(52) U.S. Cl.
USPC ........... 141/350; 141/348; 141/349; 220/86.2

(58) Field of Classification Search
USPC .................. 141/348, 349, 350, 351; 220/86.2
See application file for complete search history.

(56) References Cited

U.S. PATENT DOCUMENTS 4,946,060 A * 8/1990 Sherwood et al. ........... 220/86.2
5,732,840 A * 3/1998 Foltz ............................ 220/86.2

(Continued)

FOREIGN PATENT DOCUMENTS

EP  0872370 A1  10/1998
FR  2588806 A1  4/1987

(Continued)

OTHER PUBLICATIONS

ISR for PCT/US2008/058105 mailed Mar. 26, 2009.

*Primary Examiner* — Timothy L Maust
*Assistant Examiner* — Brandon J Warner
(74) *Attorney, Agent, or Firm* — Lowe Hauptman & Ham, LLP

(57) ABSTRACT

A vehicle fuel inlet shut-off valve assembly includes a two-piece housing having inner and outer housing components secured to each other. The housing components can be provided of different materials, with a surface coating. A flapper door assembly is secured in the outer housing component and includes directionally biased interlocking components that facilitate installation and inhibit disconnection after assembly with redundant connections.

18 Claims, 17 Drawing Sheets

(56) References Cited

U.S. PATENT DOCUMENTS

| | | | |
|---|---|---|---|
| 6,009,920 A * | 1/2000 | Palvoelgyi et al. | 141/348 |
| 6,035,906 A * | 3/2000 | Ott | 141/312 |
| 6,189,581 B1 * | 2/2001 | Harris et al. | 141/348 |
| 6,230,739 B1 * | 5/2001 | Gericke | 137/588 |
| 6,330,893 B1 | 12/2001 | O'Connell | |
| 6,681,817 B2 * | 1/2004 | Hagano et al. | 141/348 |
| 6,685,043 B1 * | 2/2004 | Long, Sr. | 220/254.5 |
| 6,691,750 B1 * | 2/2004 | Foltz | 141/350 |
| 6,705,481 B2 | 3/2004 | Temmesfeld | |
| 7,549,443 B2 | 6/2009 | Levey et al. | |
| 2005/0121085 A1 * | 6/2005 | Levey et al. | 137/592 |

FOREIGN PATENT DOCUMENTS

| | | |
|---|---|---|
| FR | 2710721 A1 | 4/1995 |
| WO | WO 2006051117 A1 * | 5/2006 |

* cited by examiner

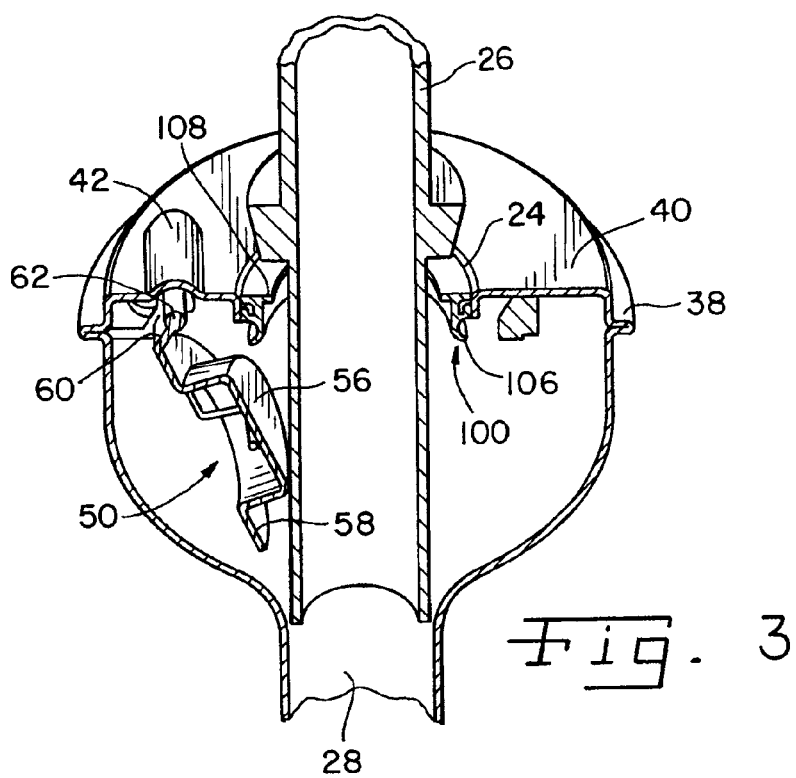
Fig. 3
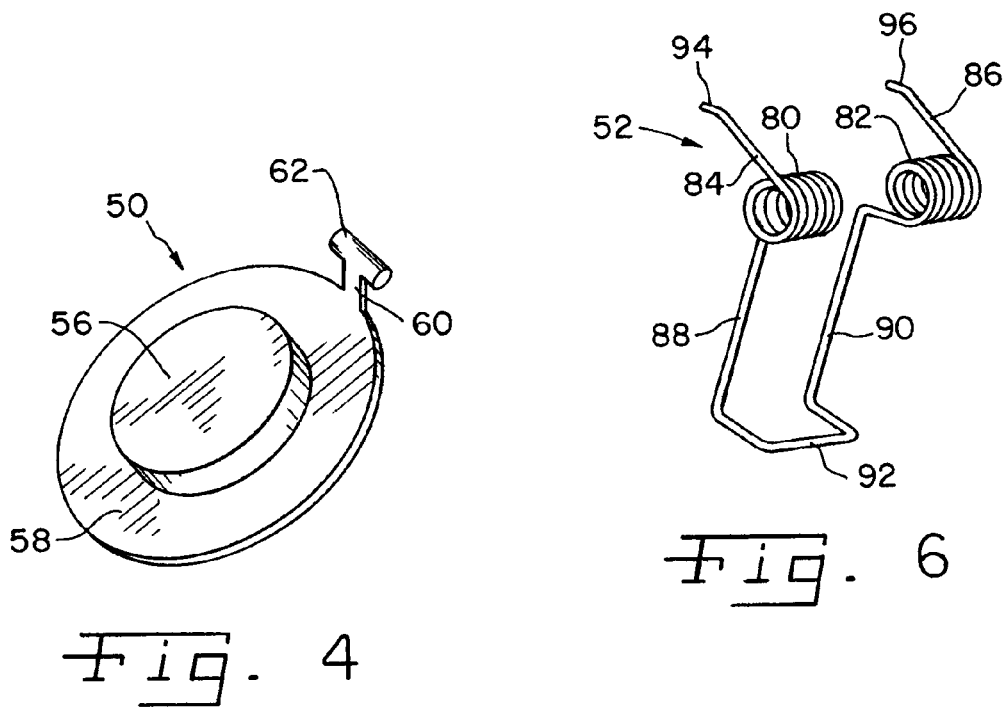
Fig. 4
Fig. 6

FUEL SHUT-OFF VALVE ASSEMBLIES AND METHODS OF MAKING AND ASSEMBLING THE SAME

RELATED APPLICATIONS

The present application is based on International Application Number PCT/US2008/058105 filed Mar. 25, 2008, claims priority from U.S. Application Provisional Application Ser. No. 60/920,615 filed Mar. 29, 2007, and is a continuation-in-part of U.S. patent application Ser. No. 10/976,709 filed Oct. 29, 2004 which claimed the benefits of U.S. Provisional Application Ser. No. 60/528,037 filed Dec. 9, 2003, U.S. Provisional Application No. 60/557,182 filed Mar. 29, 2004 and U.S. Provisional Application Ser. No. 60/582,380 filed Jun. 23, 2004, the disclosures of which are hereby incorporated by reference herein in their entirety.

FIELD OF THE INVENTION

The present invention relates to fuel systems for motor vehicles, and more specifically, to primary fuel shut-off valve assemblies in both capless and other refueling systems, and to the methods of making and assembling the same.

BACKGROUND OF THE INVENTION

Fuel systems for motor vehicles are known to include a fuel tank and a filler tube through which fuel is dispensed into the tank. It is known to use a removable threaded cap at the end of the filler tube to close the tube. The threaded fuel cap is the primary seal for the fuel system on most domestic vehicles. For the threaded cap to seal the fuel system properly, the cap must be twisted on correctly. If a fuel cap is not properly tightened, is missing or is defective, a significant amount of fuel can be released to the atmosphere through evaporation from the fuel tank.

It is known to use a movable damper and a rubber seal to close the fuel system, either as the primary shut-off valve or as a secondary, supplemental shut-off. A known assembly of this type includes a metal tube or sleeve and a plastic insert or cover adapted to be received within the sleeve. An annular groove is provided on the outer surface of the plastic insert, and a rubber seal or the like is positioned within the groove between the inner surface of the metal sleeve and the outer surface of the plastic insert. Properly functioning, an assembly of this type can be effective in minimizing the loss of fuel from the fuel system. However, through age, fatigue and deterioration of the seal and associated components, the sealed area between the insert and the outer sleeve provides a path for the leakage of vapors from the tank. Even a small leak can result in significant loss of fuel and environmental pollution.

It is known also to use a positive sealing insert in the end of the filler tube and a capless refueling closure unit at the end of the filler tube. Known capless refueling systems are complex and costly. Assembly of such a system can be difficult and time consuming.

What is needed in the art is a vehicle fuel system filler assembly that includes an effective shut-off valve assembly with reduced area of potential leakage together with an outer closure therefore that can be assembled quickly, easily and securely.

SUMMARY OF THE INVENTION

The present invention provides a fuel shut-off valve assembly having a one-piece housing of corrosion resistant material or coated material, or a two-piece housing of coated and uncoated materials; and a carrier and/or closure assembly that is locked in position after installation via redundant interlocking components.

In one aspect of one form thereof, the present invention provides a fuel shut-off valve assembly with a housing including an inner housing component defining an outlet for attachment to a fuel system and an outer housing component defining an inlet with an opening for receiving a fuel filler nozzle therein. A flapper door in the outer housing component is movable with respect to the housing for opening and closing the inlet. The inner housing component and the outer housing component are made of different materials and connected one to the other.

In another aspect of another form thereof, the present invention provides a fuel shut-off valve assembly with a housing including an inner housing component defining an outlet for attachment to a fuel system, and an outer housing component defining an opening for receiving a fuel filler nozzle therein. A flapper door in the outer housing component is movable with respect to the housing for opening and closing the opening. One of the inner housing component and the outer housing component defines a flange, and the other of the inner housing component and the outer housing component defines a collar crimped around the flange for securing the inner and outer housing components together.

In a still further aspect of a still further form thereof, the present invention provides a fuel shut-off valve assembly with a housing having an annular rim defining an opening for receiving a fuel filler nozzle therein, and a groove in an outer surface of the annular rim. A carrier has a ring surrounding the rim, and the ring has a distal edge disposed in the groove. A movable door carried by the carrier selectively opens and closes the inlet.

An advantage of the present invention is providing a fuel system shut-off valve assembly with a two-piece housing having only a limited access therethrough for a fuel filler nozzle, which can be manufactured of different materials.

A further advantage of the present invention is providing a fuel shut-off valve assembly that can be manufactured economically and assembled efficiently.

A still further advantage of the present invention is providing a fuel system shut-off valve assembly that can be assembled quickly and easily yet is secure following assembly with redundant interlocking components.

Yet another advantage of the present invention is providing a fuel system shutoff valve assembly at least portions of which can be provided of inexpensive materials and easily coated with corrosion resistant coating.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a cross-sectional view illustrating a fuel nozzle inserted into a fuel shut-off valve assembly;

FIG. 4 is a perspective view of a valve door for the fuel shutoff valve assembly;

FIG. 6 is a perspective view of a biasing spring of the valve assembly;

Figure 1:
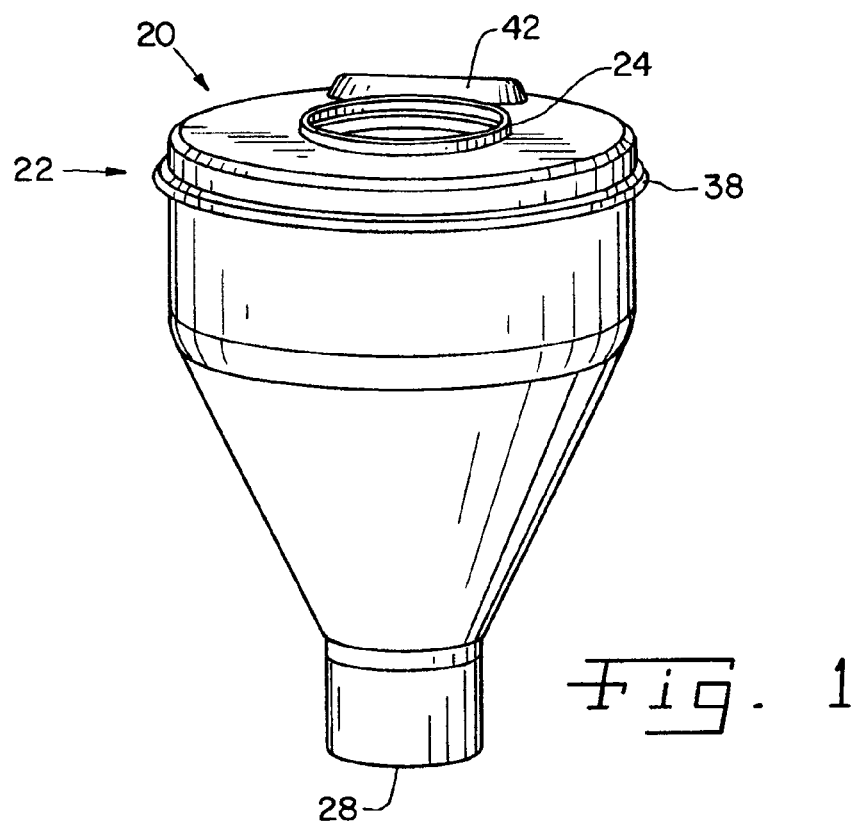
FIG. 1 is a perspective view of a fuel shut-off valve assembly.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
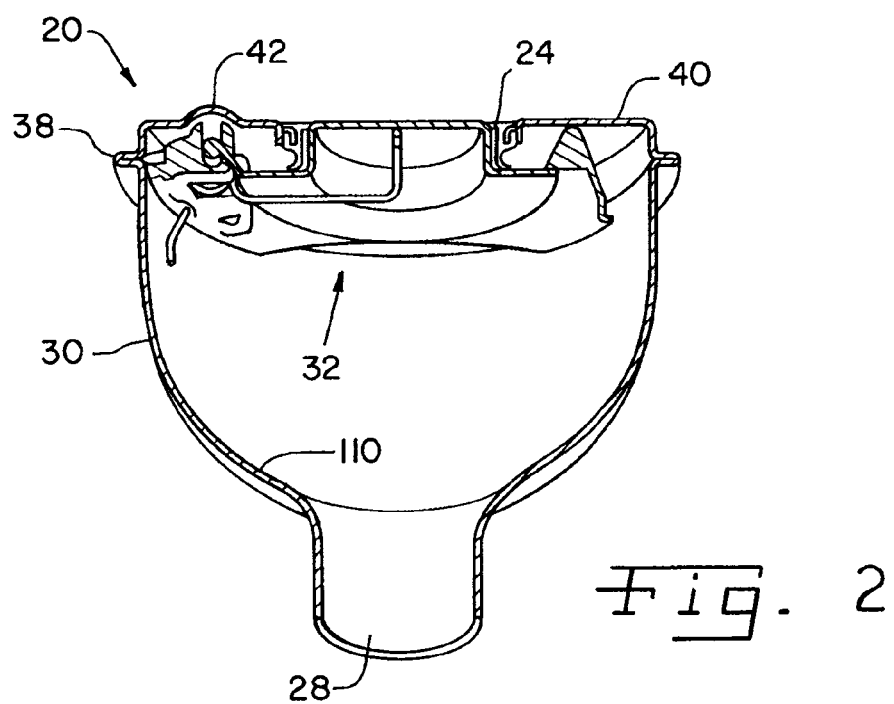
FIG. 2 is a cross-sectional view of a fuel shut-off valve assembly.
Figure 5:
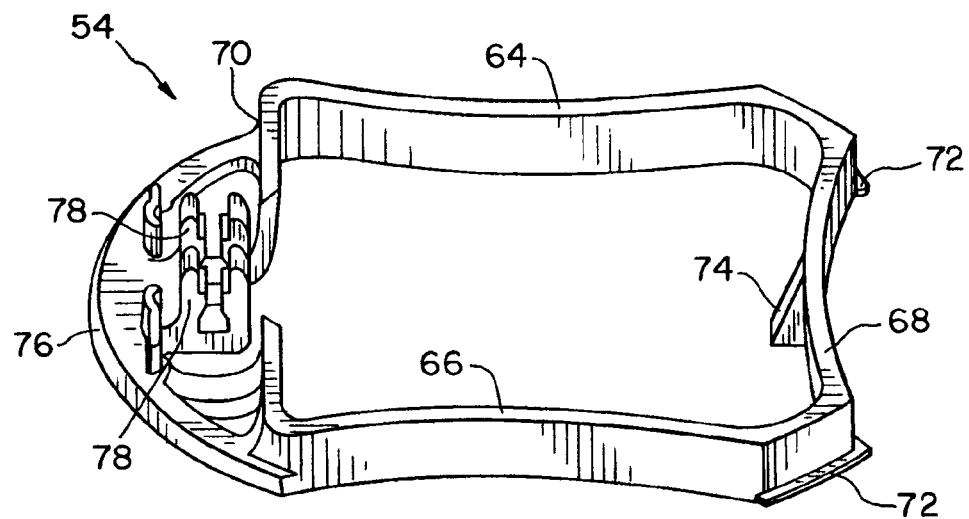
FIG. 5 is a perspective view of a carrier used in the valve assembly.

Referring now more specifically to the drawings and to FIG. 1 in particular, numeral 20 designates a primary fuel shut-off valve assembly in accordance with one aspect of the present invention. Valve assembly 20 includes an inlet end 22 having an annular inlet 24 defining a hole through which a fuel filler nozzle 26 (FIG. 3) of a fuel dispensing system is inserted for refueling a vehicle on which valve assembly 20 is installed. An outlet 28 from valve assembly 20 is provided opposite inlet end 22. As illustrated more clearly in FIG. 2, fuel shut-off valve assembly 20 includes a housing 30 in which inlet 24 and outlet 28 are defined. A valve door assembly 32 is provided for closing inlet 24, except when nozzle 26 is inserted therethrough.

Figure 8:
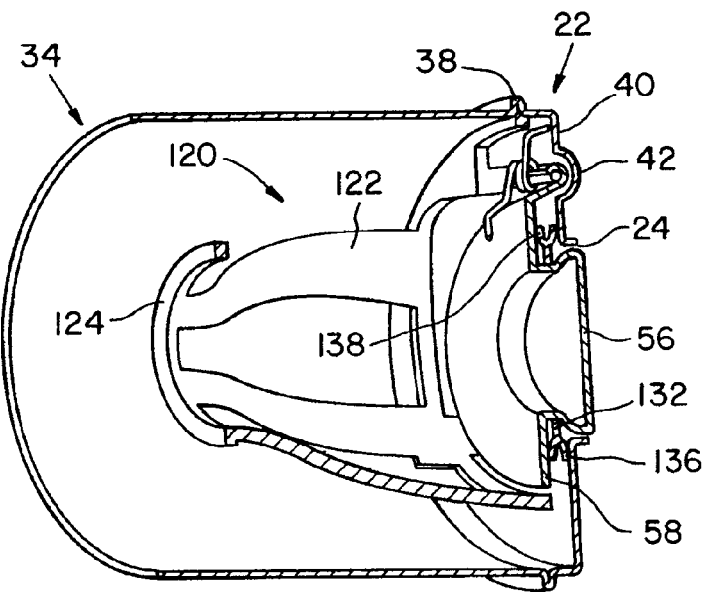
FIG. 8 is a cross-sectional view of an alternate form of a valve assemble during an early stage of manufacture.
Figure 9:
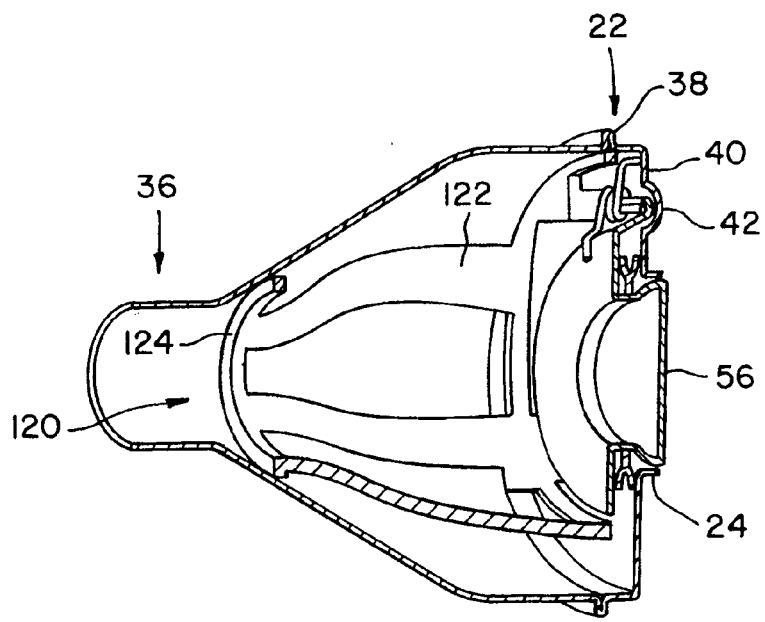
FIG. 9 is a cross-sectional view similar to that of FIG. 8, but illustrating a subsequent step during manufacture of the valve assembly.

Housing 30 is a one-piece structure that can be made of any suitable material, such as, for example, stainless steel, carbon steel, cold roll steel or aluminum. Housing 30 can be formed by stamping or other similar technique, and is first formed with substantially closed and finished inlet end 22 and a substantially open outlet end 34, as shown in FIG. 8, substantially open outlet end configuration 34 being required for assembly. Valve door assembly 32 is inserted into housing 30 through substantially open outlet end configuration 34 and is secured in housing 30 at inlet end 22. Thereafter, outlet end configuration 34 is reformed to define a finished outlet end 36 having outlet 28 therein (FIG. 9). Outlet end 36 is attached to a fuel system filler pipe (not shown) by suitable means, such as, for example, welding, adhesive or the like.

Suitable processes for reforming open outlet end 34 to finished outlet end 36 include multiple coning operations in a press and spin forming. During the initial forming and reforming processes, stresses are induced into housing 30. To reduce the likelihood of stress induced cracking, all or portions of housing 30 can be annealed. Localized induction annealing can be used on only that portion of housing 30 that is being reformed. Multiple annealing steps can be used as the initial shaping and reforming occur.

In the exemplary embodiment shown, housing 30 includes a radially outwardly extending outer ring 38 formed by pinching or the like. Housing 30 includes a substantially closed end plate 40 in which inlet 24 is defined. A dimple or enlargement 42 is provided in end plate 40. Internally of housing 30, ring 38 and enlargement 42 define a channel 44 and cavity 46, respectively, for the securement and operation of valve door assembly 32, as will be described in greater detail hereinafter.

Valve door assembly 32 includes a flapper door 50, a biasing element 52 and a carrier 54. Carrier 54 is secured in housing 30, and flapper door 50 and biasing element 52 are connected to and supported by carrier 54 for operation with respect to outlet 28.

Flapper door 50 is hat-like in shape and includes a cupped central portion 56 for projecting through inlet 24 and a peripheral flange 58 about central portion 56. Near the outer edge of flange 58, a hinge arm 60 and a rolled pin hinge element 62 are provided, with pin 62 transverse to arm 60 at the distal end of arm 60. Central portion 56 is of a size and shape to project into inlet 24 from the inside of housing 30. As shown in FIG. 1, inlet 24 defines a ridge from the external surface of end plate 40 that stands proud of central portion 56, to protect central portion 56 from inadvertent opening during a crash or other event.

Carrier 54 is a frame-like structure having opposed sides 64, 66 and opposed ends 68, 70 between opposed sides 64, 66. One or more edge element 72 is configured and arranged to be received in channel 44 for securing carrier 54 within housing 30. In the exemplary embodiment shown in the drawings, two edge elements 72 are shown one each substantially at the corner junctions between sides 64, 66 and end 68. End 68 further defines an abutment 74 as a stop for movement of flapper door 50 with respect to carrier 54.

End 70 of carrier 54 is configured for pivotally holding flapper door 50 and biasing element 52 in operative positions, as will be described more fully hereinafter. End 70 is substantially arch-shaped, having an apex area 76 that is also configured and arranged to be received in channel 44 for the positioning and securement of carrier 54 within housing 30. One or more clamping arm 78 projects outwardly from end 70 in a substantially axially direction with respect to housing 30 of the assembled valve assembly 20. In the exemplary embodiment shown, two clamping arms 78 are provided. Cavity 46 defines a space for receiving the distal ends of clamping arms 78 and thus orients and positions carrier 54 relative to housing 30. Clamping arms 78 receive and retain hinge pin 62 of flapper door 50, thus allowing pivotal movement of flapper door 50 about an axis defined by pin 62.

Biasing element 52 is a double torsion spring sized to provide appropriate torque on flapper door 50 for sealing engagement of flapper door 50 relative to inlet 24. Biasing element 52 includes helical spring portions 80, 82 each having an individual arm 84, 86 extending therefrom. Legs 88, 90 from spring portions 80, 82, respectively, are interconnected by a common foot element 92. In the assembled valve assembly 20, foot 92 is disposed against central portion 56 substantially at the center thereof such that spring force is applied to the center of flapper door 50 for even load distribution on flapper door 50. Biasing element 52 thereby provides a consistent, equal seal force between flapper door 50 and inlet 24 throughout the seal area. Distal end segments 94, 96 of arms 84, 86, respectively, are disposed against housing 30 in the assembled valve assembly 20. Biasing element 52 thereby functions as a grounding path through valve assembly 20 between flapper door 50 and housing 30 so that a static electric charge conveyed through nozzle 26 to flapper door 50 during a refueling operation can be conducted to ground through valve assembly 20. The risk of fuel vapor ignition from a static electric discharge is reduced.

Figure 7:
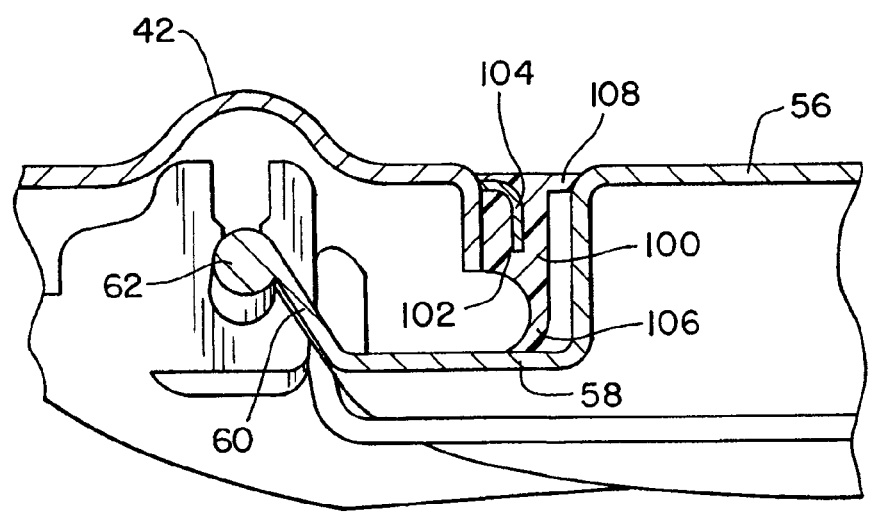
FIG. 7 is a cross-sectional view of a seal in the valve assembly.

In the exemplary embodiment of FIG. 7, a seal 100 is functionally disposed between inlet 24 and flapper door 50. Seal 100 is a rubber-like annular body, which may be synthetic, and defines an annular groove 102. Inlet 24 has an inwardly extending lip 104. Seal 100 is attached to inlet 24 by pressing seal 100 such that lip 104 slides into annular groove 102. An annular tail element 106 of seal 100 sealingly engages flange 58 of flapper door 50 to establish the primary seal region between flapper door 50 and housing 30 at inlet 24. An annular tip 108 of seal 100 lies against the outer surface of central portion 56, thereby providing an initial outer seal as well; to keep water and contaminants from the primary seal area established by tail element 106.

In the embodiment thus far described, an inner surface 110 of housing 30 provides a guiding surface against which nozzle 26 can slide to be directed to outlet 28 during a refueling operation. However, independent structure may also be provided within housing 30 for guiding nozzle 26. FIGS. 8 and 9 illustrate a cone 120 provided as an extension from carrier 54. Cone 120 can be a substantially continuous insert, or can be provided as a structure of spaced substantially longitudinally extending ribbons 122 and an end ring 124 as shown in the drawings.

Figure 10:
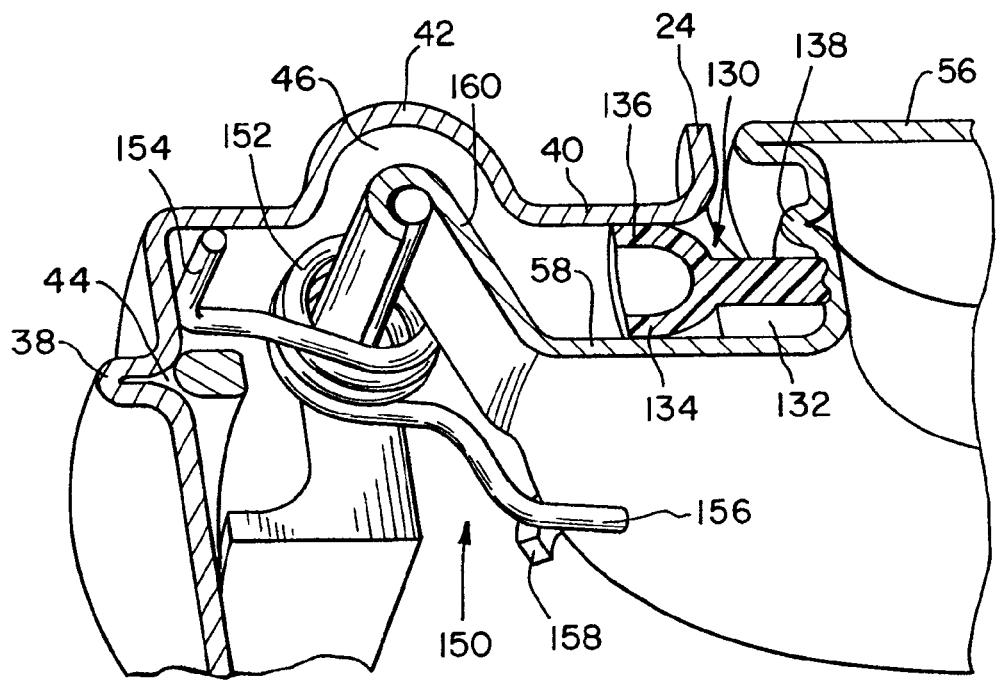
FIG. 10 is a cross-sectional view of another embodiment of a seal for the valve assembly.
Figure 11:
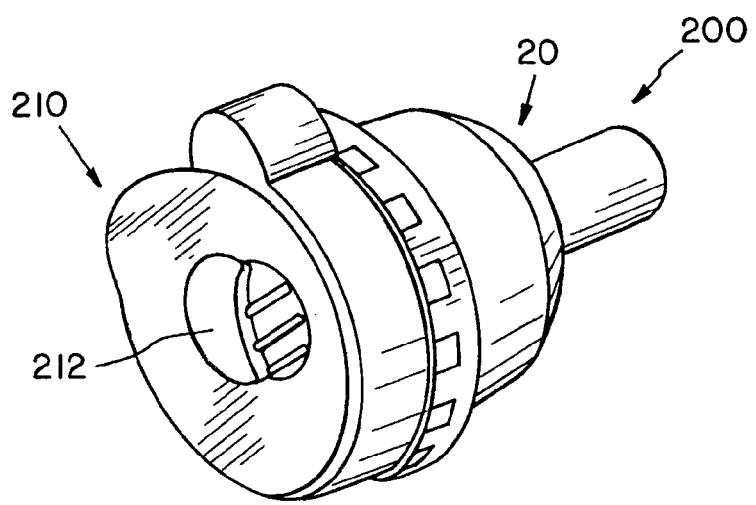
FIG. 11 is a perspective view of the shut-off valve assembly with an outer closure or cover assembly attached thereto in a capless refueling system.
Figure 12:
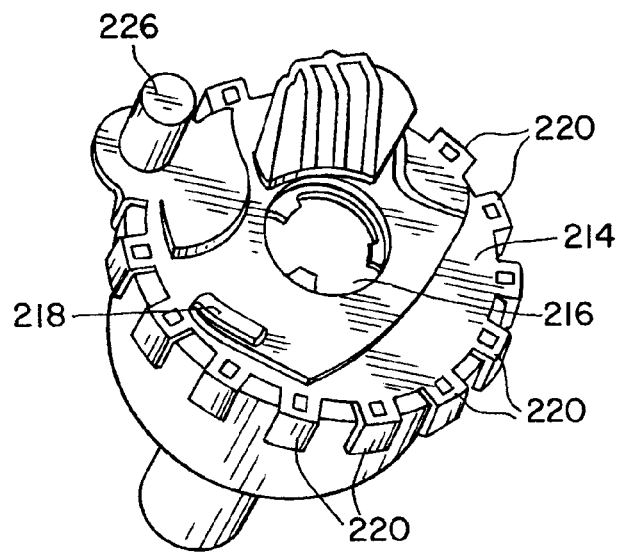
FIG. 12 is a perspective view of a first step of the final assembly for the capless refueling system.

FIG. 10 illustrates an alternative embodiment of a seal element 130 that is fastened to flapper door 50 rather than to housing 30. Seal 130 is substantially Y-shaped, having a central trunk 132 and oppositely directed branches 134 extending therefrom. Seal 130 is provided about the outer periphery of central portion 56 of flapper door 50, which may include an annular ridge 138 to define an area between ridge 138 and flange 58 for receiving seal 130. Branches 134, 136 establish a seal against flange 58 and an inner surface of end plate 40 adjacent inlet 24 when flapper door 50 is held in a closed position.

FIG. 10 also illustrates an alternate embodiment of a biasing element 150. A single spring portion 152 has an arm 154 in contact with end plate 40 and a leg 156 in contact with flange 58. Flange 58 has a projection 158 for holding leg 156 in proper position against flange 58. A flapper door hinge arm 160 defines a hooked end 162 rotatably engaged on a pin 164 held in housing 30.

In use of primary fuel shut-off valve assembly 20, force is exerted against flapper door 50 as nozzle 26 is pushed thereagainst. The force from biasing element 52 is overcome and flapper door 50 pivots open, allowing full entrance of nozzle 26. When refueling has been completed, nozzle 26 is extracted, and biasing element 52 causes flapper door 50 to pivot closed. Sufficient force is exerted from biasing element 52 to create an effective seal between flapper door 50 and housing 30 via seal 100 or seal element 130. Since housing 30 is a seamless, contiguous body, no other potential path for leakage is present.

The force from biasing element 52 facilitates pressure equalization between the pressure within the fuel tank and thus housing 30 and ambient pressure. As fuel is removed from the fuel tank, a slight under pressure can exist, less than ambient pressure. The pressure differential experienced on opposite sides of flapper door 50 causes a slight and brief movement of flapper door 50. This controlled "leakage" is directional, from ambient to the interior of housing 30, allowing equalization of pressures. As soon and so long as the pressure differential is insufficient to overcome the force from biasing element 52, an effective seal is provided.

Figure 18:
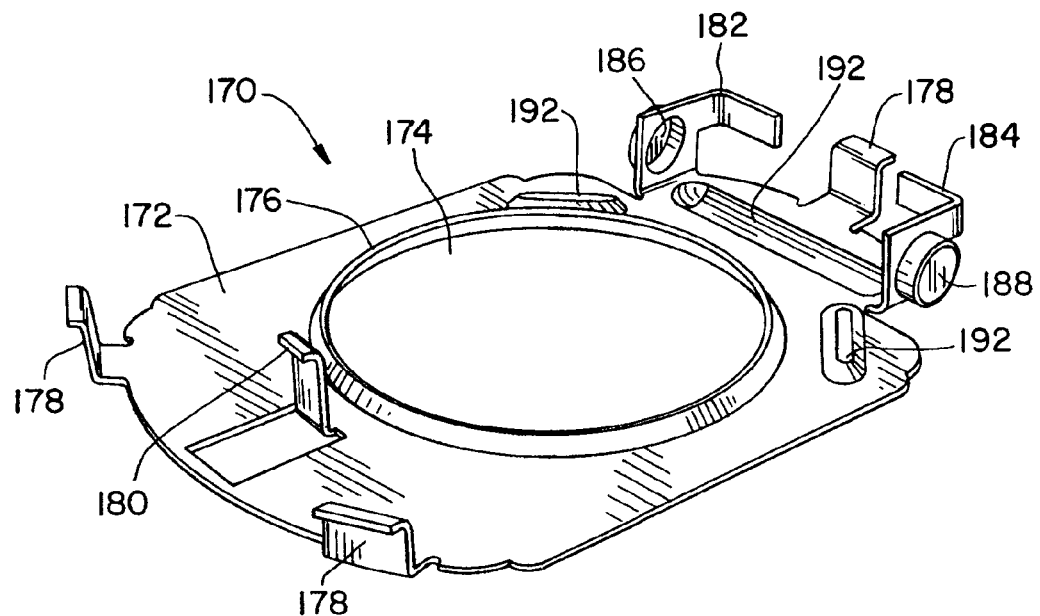
FIG. 18 is a perspective view of a second embodiment for a carrier used in the valve assembly.
Figure 19:
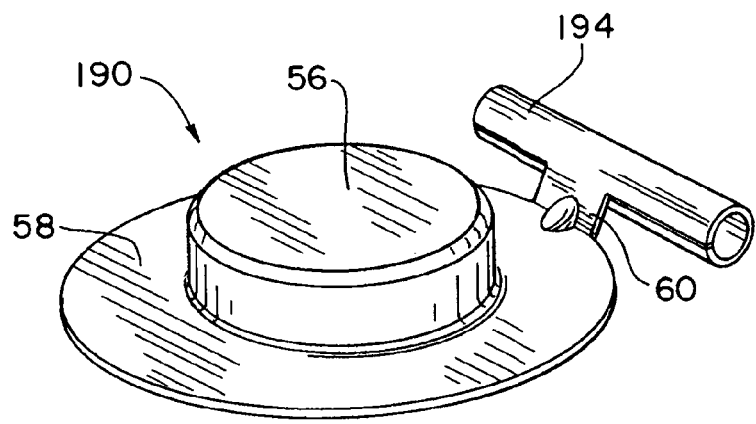
FIG. 19 is a perspective view of a second embodiment for the valve door of the valve assembly.

FIG. 18 illustrates a carrier second embodiment 170. Carrier 170 has a plate-like body 172 that can be made of metal advantageously and defines a circular opening 174. An edge 176 of body 172 defining opening 172 can be angled to hold or engage a seal (not shown). Legs 178 from body 172 are provided about the perimeter of body 172 and are shaped, sized and configured to be received in channel 44 for securing carrier 170 within housing 30. In the exemplary embodiment of FIG. 18, three legs 178 are shown. Body 172 further defines a stop 180, which may be formed from a bent, cutout section of body 172, as shown. Opposed, spaced arms 182, 184 define cup-like cavities 186, 188, respectively, for pivotally holding a flapper door 190 (FIG. 19). Dimples 192 in various shapes, sizes and locations can be provided to strengthen body 172, as those skilled in the art will understand readily. Three dimples 192 are shown but more or fewer than three dimples 192 can be used.

Flapper door 190 (FIG. 19) is hat-like in shape similar to flapper door 50. Thus, flapper door 190 also includes a cupped central portion 56 for projecting through opening 174 and inlet 24 and a peripheral flange 58 about central portion 56. Near the outer edge of flange 58, a hinge arm 60 and a rolled pin hinge element 194 are provided, with pin element 194 transverse to arm 60 at the distal end of arm 60. Pin element 194 is sufficiently long to extend between and be received rotatably in cup-like cavities 186, 188.

In a fully assembled capless refueling system 200 (FIG. 11), primary fuel shut-off valve assembly 20 is connected to a cover assembly 210 having a slidable puck 212 therein which is slid out of the way upon insertion of nozzle 26. FIGS. 11-17 illustrate the manner in which capless refueling system 200 is assembled. In the exemplary embodiment shown, a base 214 is provided between cover assembly 210 and primary fuel shut-off valve assembly 20. Base 214 is a substantially plate-like structure having an aperture 216 substantially centrally located therein to align with inlet 24 of primary fuel shut-off valve assembly 20. A bulge 218 in base 214 is sized and shaped to engulf enlargement 42 for accurately positioning base 214 relative to primary fuel shut-off valve assembly 20. Snap tabs 220 are provided at the periphery of base 214 and provide a snap-fit type engagement with ring 38 on housing 30. For clarity, some but not all snap tabs 220 are designated with a reference numeral in the drawings. With enlargement 42 positioned within bulge 218 (FIG. 14), and snap-tabs 220 engaged over ring 38, base 214 is securely and accurately positioned with respect to primary fuel shut-off valve assembly 20.

Figure 13:
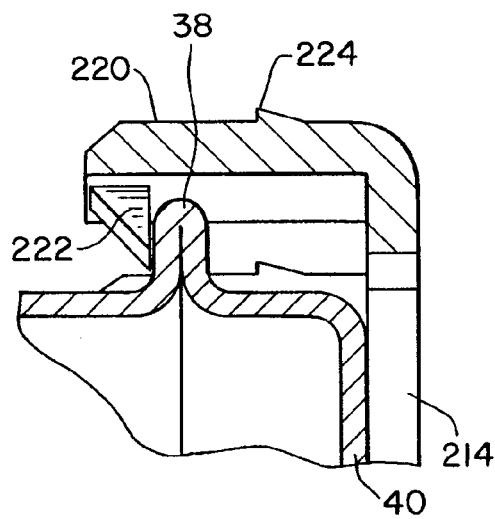
FIG. 13 is a fragmentary cross-sectional view of the assembly shown in FIG. 12.
Figure 14:
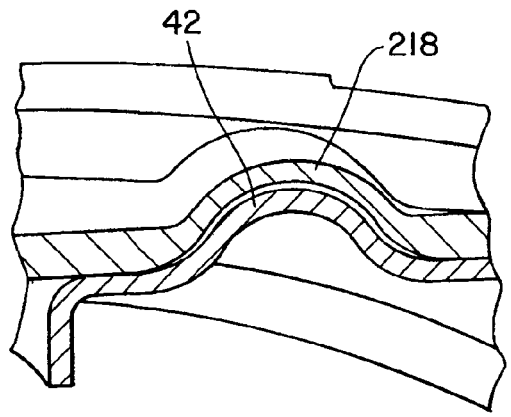
FIG. 14 is a cross-sectional view of the partial assembly shown in FIG. 12, illustrating the structure by which the parts are keyed one to another for proper final orientation.
Figure 15:
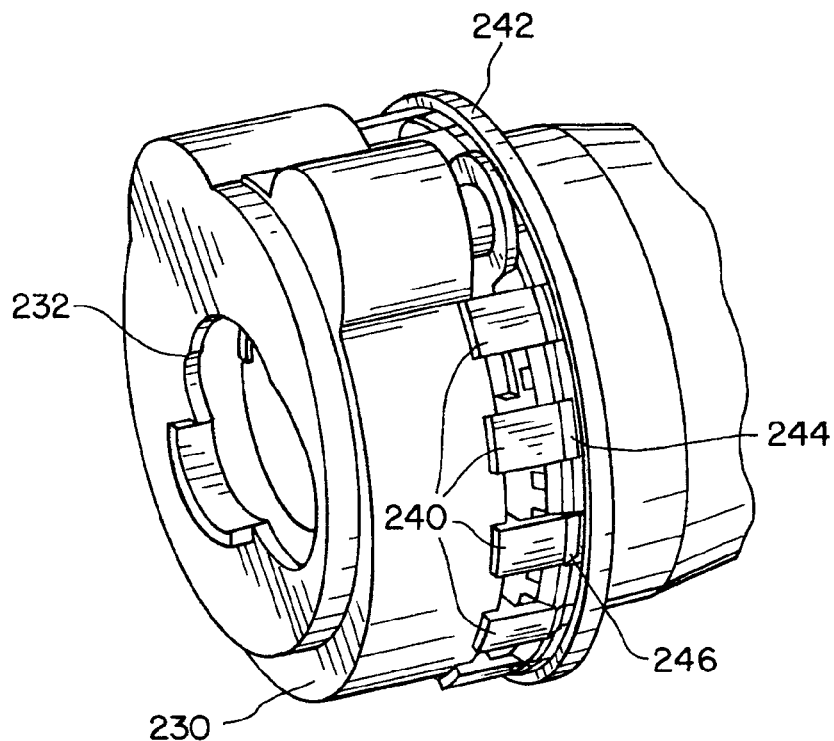
FIG. 15 is a perspective view of the final stages of assembly for the shut-off valve assembly and cover in the capless refueling system.
Figure 16:
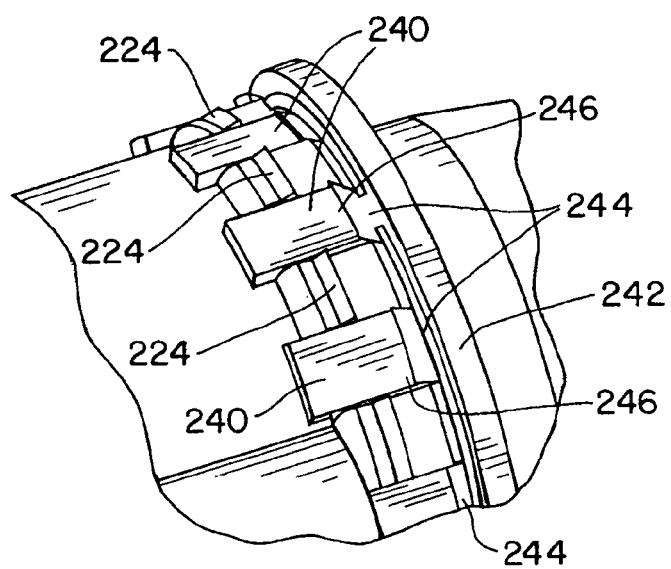
FIG. 16 is a fragmentary view of the assembly shown in FIG. 15.
Figure 17:
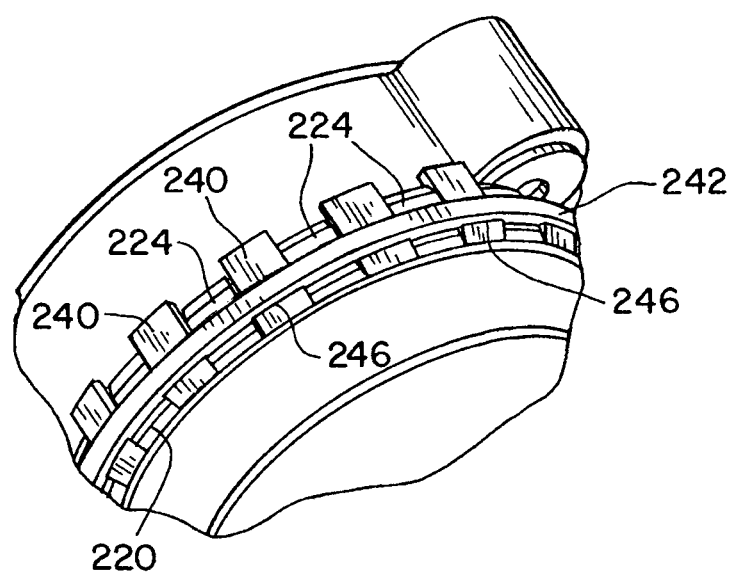
FIG. 17 is a fragmentary perspective view of the final assembly.

One snap tab 220 is illustrated in enlarged cross-sectional view in FIG. 13. Snap tab 220 includes an angularly downwardly depending catch 222 at the distal end of snap tab 220. The angular leading face on catch 222 forces snap tab 220 to deflect upwardly as base 214 is pushed over ring 38. Once snap tab 220 and particularly catch 222 thereof is passed ring 38, snap tab 220 returns to the non-deflected position and catch 222 restricts base 214 from being pulled away from primary fuel shut-off valve assembly 20. The outer surface of snap tab 220 has an outwardly directed stay 224 thereon, the purpose of which will be described hereinafter.

Base 214 further includes a post 226 for rotatably receiving an arm of the pendulum-like puck 212. A spring or other biasing means is associated with puck 212 to urge it towards a closed position. The internal structures of cover assembly 210 and puck 212 are not part of the present invention, need not be described for a complete understanding of the present invention and will not be described in further detail herein.

Cover assembly 210 also includes an outer cover 230, which is a cup-like structure having a substantially axially oriented opening 232 to align with aperture 216 and inlet 24. Puck 212 operates within cover 230 to open or close opening 232 when a nozzle 26 is inserted therein or removed therefrom.

A plurality of cover tabs 240 extend outwardly from cup-like cover 230 and are configured and arranged to substantially interdigitate with snap tabs 220 of base 214. A ring 242 is connected to the ends of cover tabs 240 by frangible links 244. Cover tab stays 246 are provided on the outer or distal end portions of cover tabs 240. During assembly, cover 230 is slid over the internal structures including puck 212 and along the outer edge of base 214, with cover tabs 240 interdigitating with snap tabs 220. When cover 230 is in the fully inserted position, frangible links 244 are fractured such that ring 242 is loose. Ring 242 is then slid over cover tabs 240 which are deflected inwardly. Ring 242 is slid over cover tabs 240 until it abuts stays 224 on snap tabs 220. Ring 242 will have passed completely over cover tab stops 246 which causes the inward deflection of cover tabs 240. Once cover tab stops 246 have passed completely through ring 242, cover tabs 240 will return to the non-deflected position. At that point, ring 242 is secured between cover tab stops 246 and stays 224. In this manner, cover 230 is securely attached to base 214. If servicing is required, ring 242 is broken to free cover 230 from base 214. A separate, independent ring can be used of similar size and shape to ring 242 for re-securing cover 230 on base 214. Other types of hose clamps and the like also can be used. In the event of a crash, cover assembly 210 can break away from valve assembly 20, which will remain closed and sealed to prevent fuel spillage.

In accordance with the present invention, the housing also can be formed of two parts, so that a primary fuel shutoff valve assembly 300 (FIG. 20) includes an inner housing component 302 and an outer housing component 304. A valve door assembly 306 is provided in outer housing component 304 and can be similar to valve door assembly 32 described previously herein, or valve door assembly 306 can be of other types and constructions, including that to be described subsequently herein. A cover assembly 308 is connected to outer housing component 304 in the final assembly, but is shown disconnected therefrom in the drawings. Cover assembly 308 can be of conventional style having a cap, or can be of a capless style such as that disclosed previously herein. The present invention is not limited in scope to a particular type of cover assembly.

Inner housing component 302 includes a funnel-shaped inlet section 310 having an open end 311, and a pipe section 312 in flow communication with funnel shaped inlet section 310 and a vehicle fuel tank (not shown). Inner housing component 302 can be provided of less expensive carbon steel or other material and can be coated easily and conveniently with suitable anti-corrosion or other protective coating. A portion of coating 313 is shown in a broken away portion of inner housing component 302. It should be understood however that coating 313 covers at least substantially the entire exposed inner surface of inner housing compartment 302 and may be a thin surface coating. Access to the inner surfaces of inner housing component 302 for applying a coating thereto is easily gained through the large opening at the distal end of funnel shaped inlet section 310. Accordingly, various coating techniques can be used including spraying or other directed application methods, as well as immersion or other techniques so as to cover the entire structure, including the outer surfaces thereof.

Outer housing component 304 is provided of stainless steel or other less reactive material not requiring a surface coating for corrosion protection. Valve door assembly 306 is installed in outer housing component 304, and the assembly is then secured to inner housing component 302 by an arrangement including a collar crimped around a flange. Since outer housing component 304 is made of metal or other material not requiring coating, the installation of valve door assembly 306 can be accomplished quickly and easily, without harming a coated surface or the like.

Figure 20:
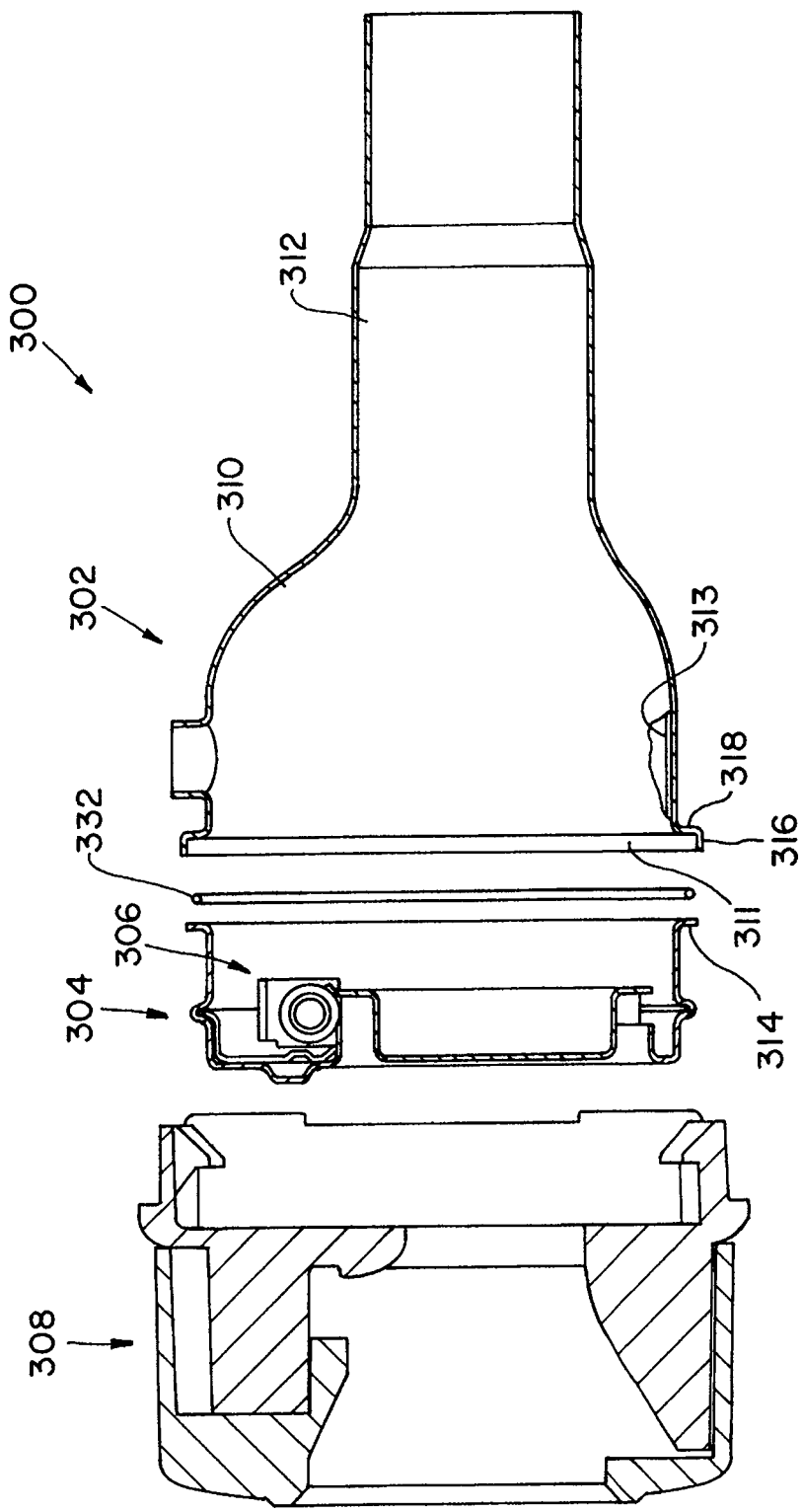
FIG. 20 is an exploded view, partially broken away, of a fuel system having a fuel shutoff valve assembly of the present invention with a two-piece housing.
Figure 21:
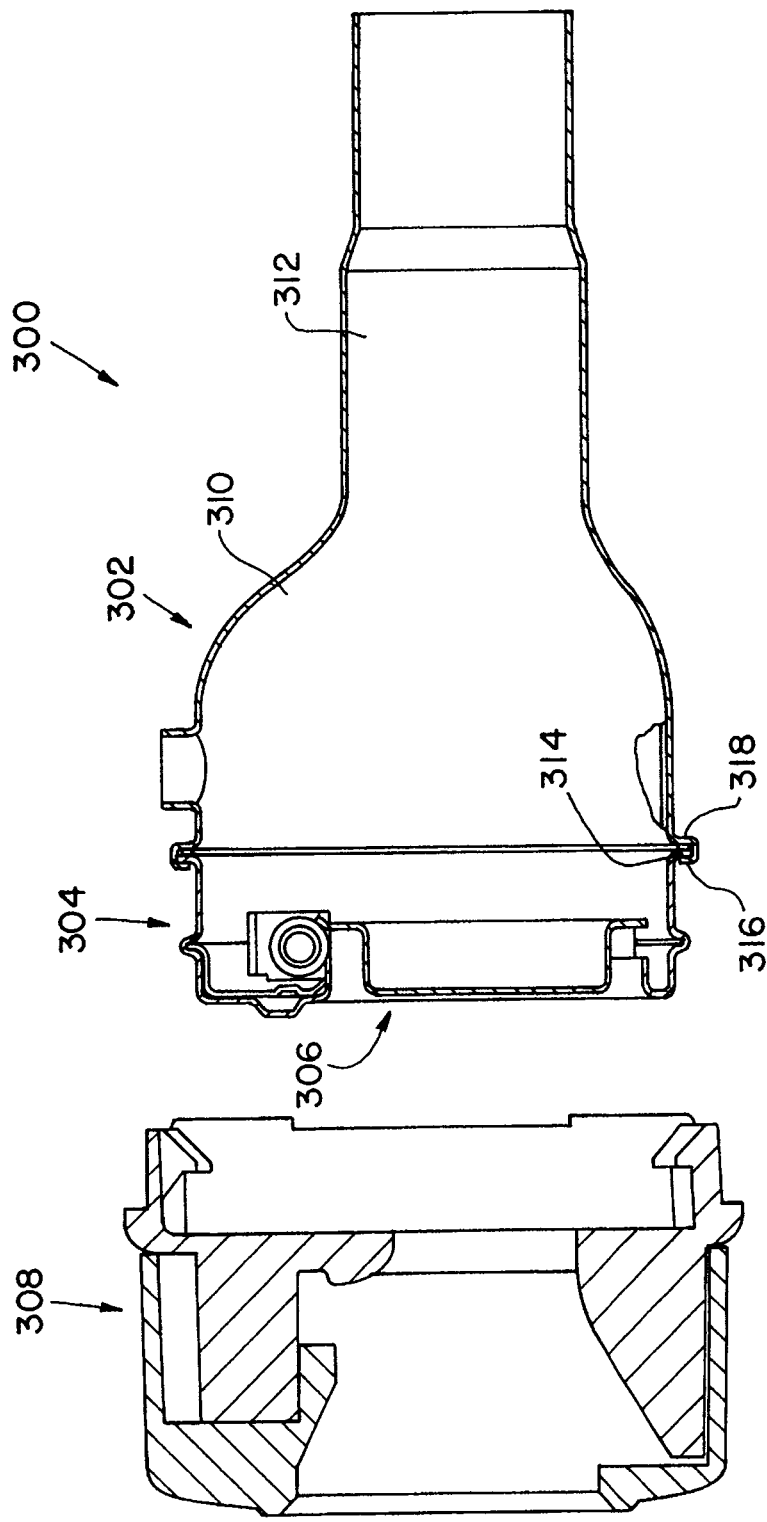
FIG. 21 is an exploded view similar to that of FIG. 20 but illustrating the fuel shutoff valve in a further state of assembly.

In a first embodiment for a two piece housing shown in FIGS. 20 and 21, outer housing component 304 is provided with a radially outwardly directed flange 314, and inner housing component 302 is provided with an annular collar 316 and a shoulder 318 directed inwardly from the base of collar 316 to inlet section 310. During assembly, flange 314 is placed within collar 316 and against shoulder 318. Collar 316 is folded over flange 314 and crimped there against, to secure outer housing component 304 to inner housing component 302 by pinching flange 314 between shoulder 318 and the folded over portion of collar 316, as shown in FIG. 21.

Figure 22:
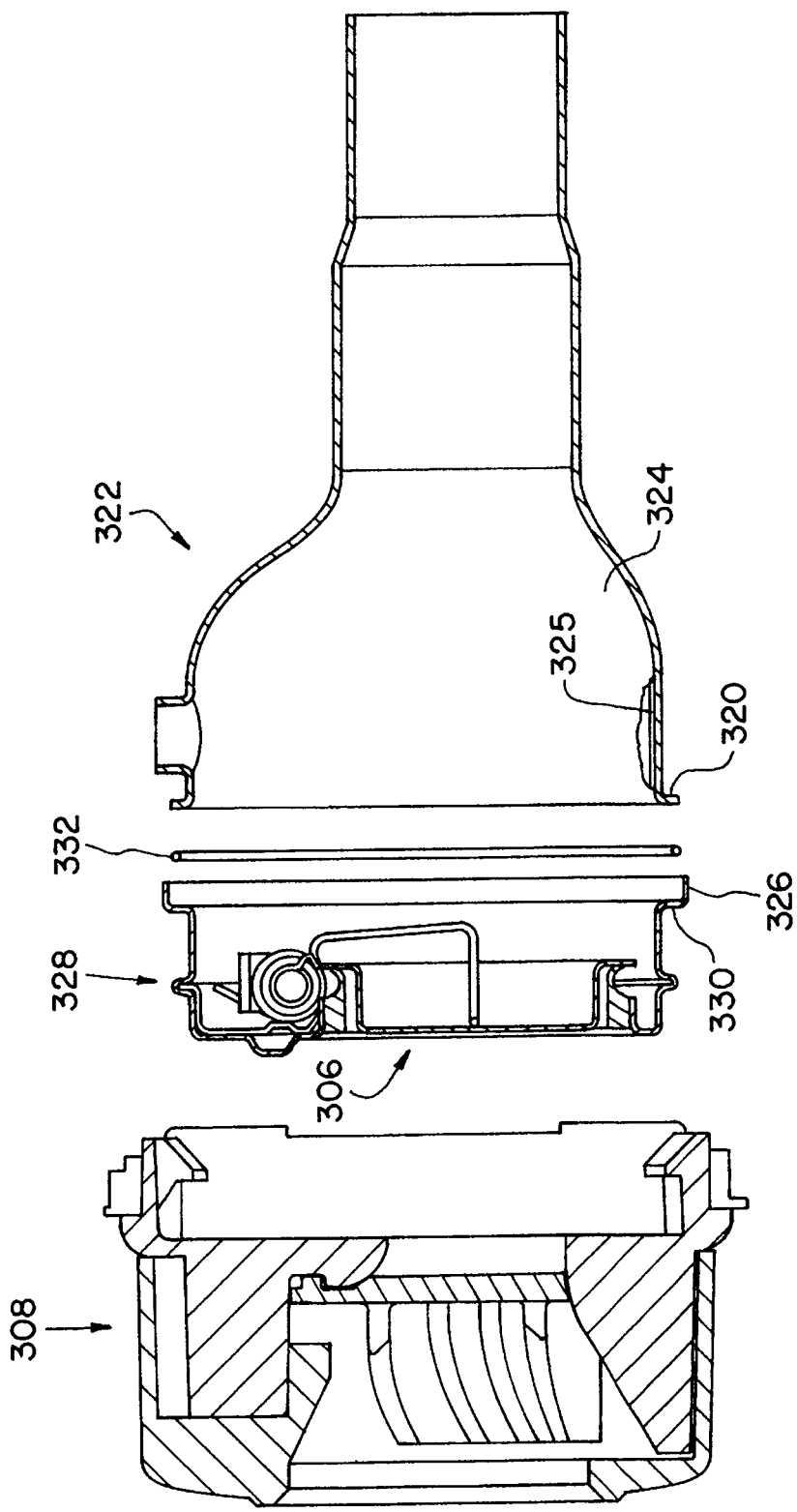
FIG. 22 is an exploded view, partially broken away, of a fuel system having a fuel shutoff valve assemble with yet another embodiment of a two-piece housing.
Figure 23:
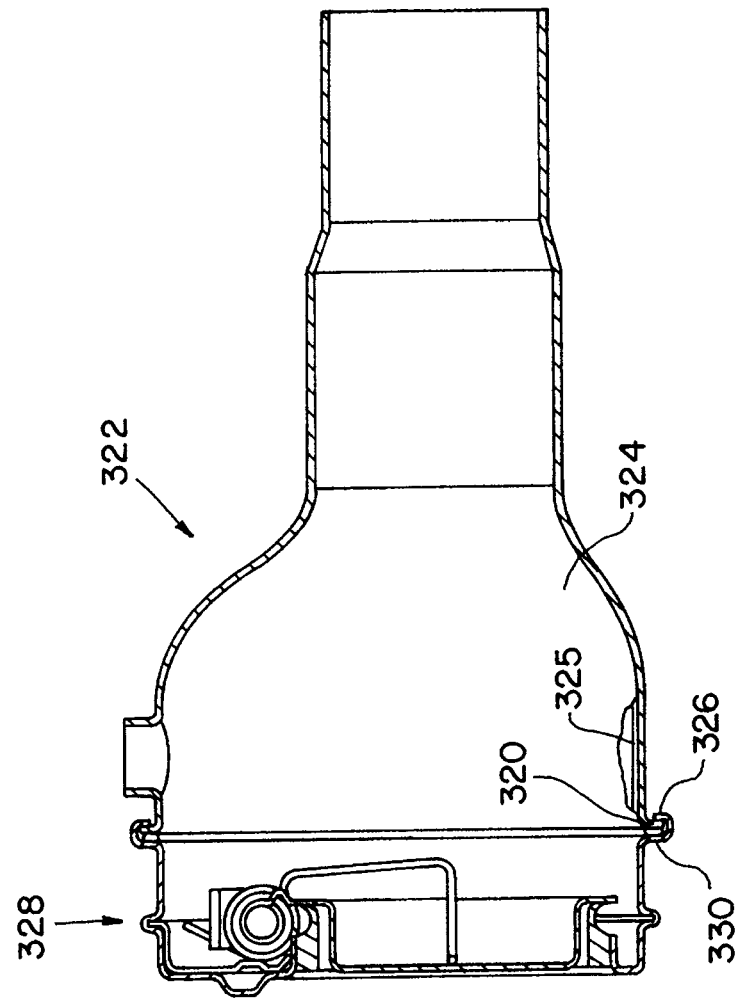
FIG. 23 is an exploded view similar to that of FIG. 22 but illustrating the fuel shutoff valve in a further state of assembly.
Figure 23:
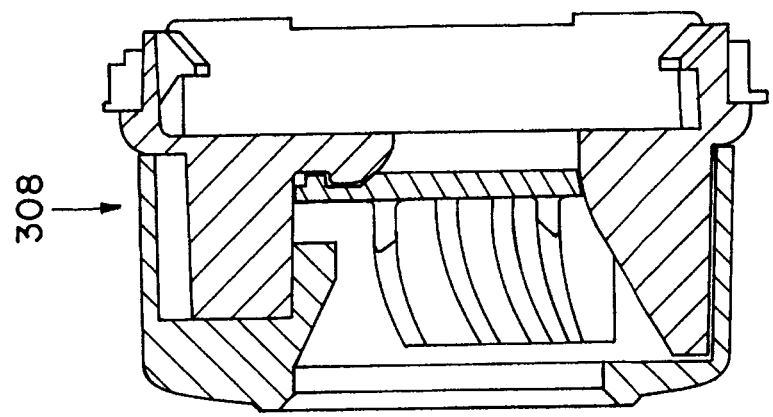
Figure 24:
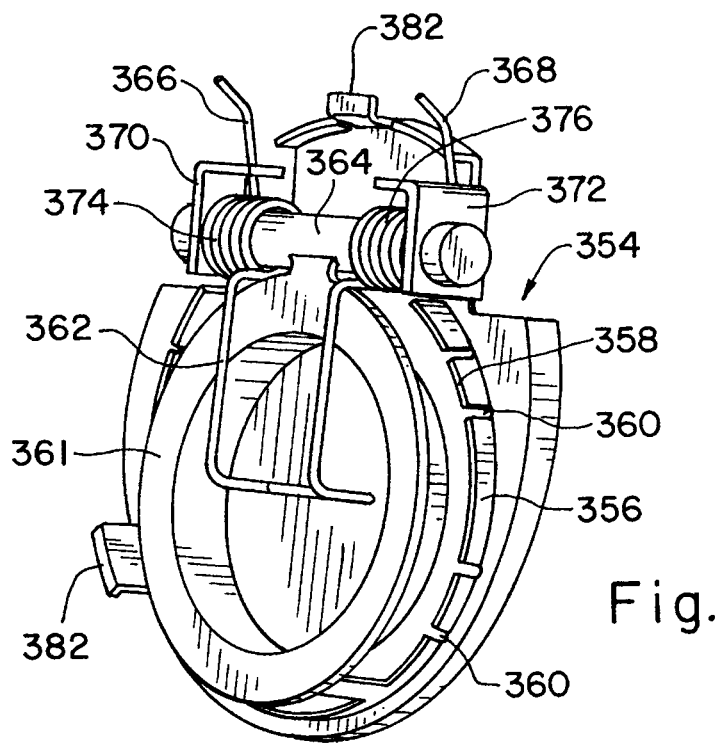
FIG. 24 is a perspective view of a valve door and carrier in accordance with another aspect of the present invention.
Figure 25:
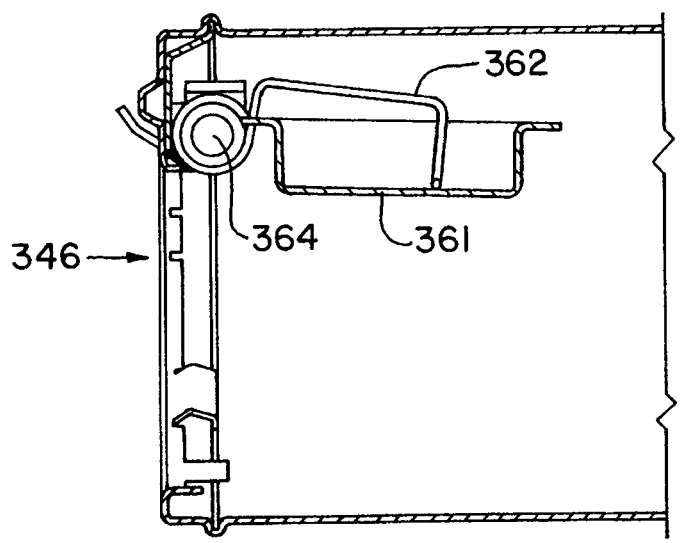
FIG. 25 is a fragmentary cross-sectional view of a valve door and carrier similar to that shown in FIG. 24 in an installed position in a housing, with the door shown opened.
Figure 26:
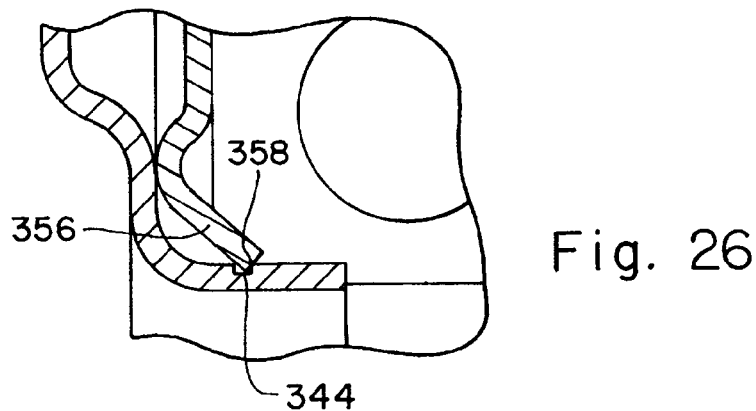
FIG. 26 is a fragmentary cross-sectional view of a housing and carrier.

In an alternative arrangement for a two piece housing shown in FIGS. 22 and 23, an outwardly directed annular flange 320 is provided on an inner housing component 322 at the outer edge of a funnel-shaped inlet section 324. Inner housing component 322 can be provided with a suitable surface coating 325 as described previously with respect surface coating 313 on inner housing component 302. A crimpable collar 326 is provided on an outer housing component 328, with an inwardly directed shoulder 330 at the base thereof. During assembly, flange 320 is placed within collar 326 and against shoulder 330. Collar 326 is folded over flange 320 and crimped there against, to secure outer housing component 328 to inner housing component 322 by pinching flange 320 between shoulder 330 and the folded over portion of collar 326, as shown in FIG. 23.

In either of the two-part housing assemblies just described, that shown in FIGS. 20 and 21 or that shown in FIGS. 22 and 23, a seal 332 can be used between flange 314 or 320 and shoulder 318 or 330.

An advantage of providing flange 320 on inner housing component 322, with crimpable collar 326 on outer housing component 328 as shown and described with respect to FIGS. 22 and 23 is that physical alteration or manipulation by deformation, bending and crimping of the coated component is not required. Instead, the uncoated stainless steel or other non-coated material of outer housing component 328 is folded and crimped, and the potential for damage or cracking to coating 325 of inner housing component 322 is reduced.

It should be understood that other types of connections can be used between the inner and outer housing components in the two-piece housing embodiment wherein the inner and outer components are provided of different materials, with one being coated and the other not coated. A deformable collar on one of the components crimped over a flange on the other of the components as described in the exemplary embodiments is merely one suitable structure for securing the inner and outer housing components together, and other fastening arrangements also can be used, such as but not limited to bonding with adhesives, welding and the like, physical connectors either separate from the components or integral with the components, interference engagements between components, threaded and other interlocking engagements, and the like.

Figure 27:
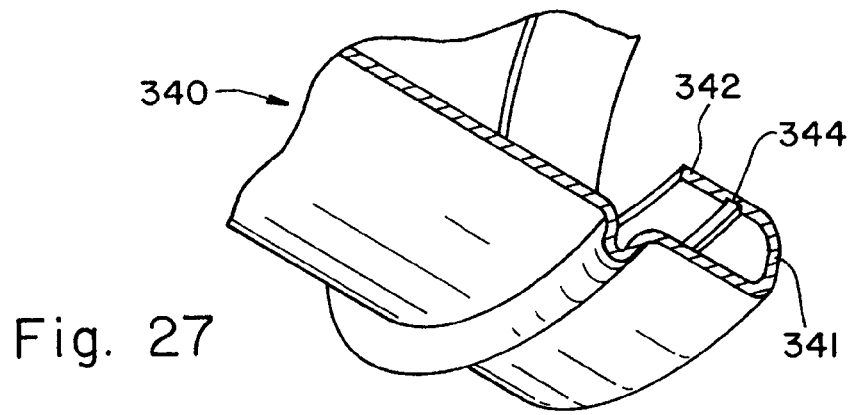
FIG. 27 is a fragmentary cross-sectional view of a portion of a housing for receiving a carrier.
Figure 28:
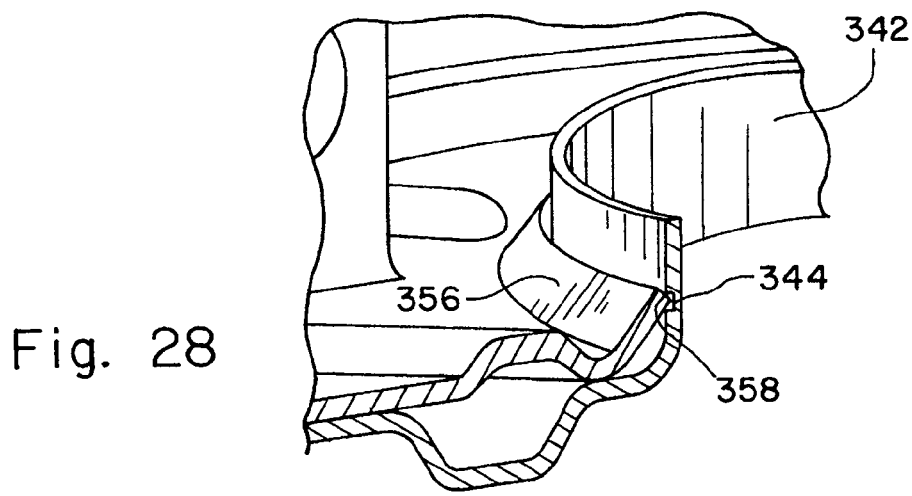
FIG. 28 is a fragmentary cross-sectional view of another portion of the housing and carrier.
Figure 29:
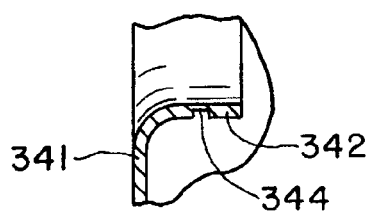
FIG. 29 is a cross sectional view of a portion of a drawn outer housing in accordance with the present invention.
Figure 30:
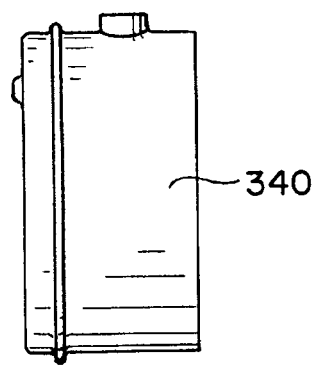
FIG. 30 is an elevational view of the housing.
Figure 31:
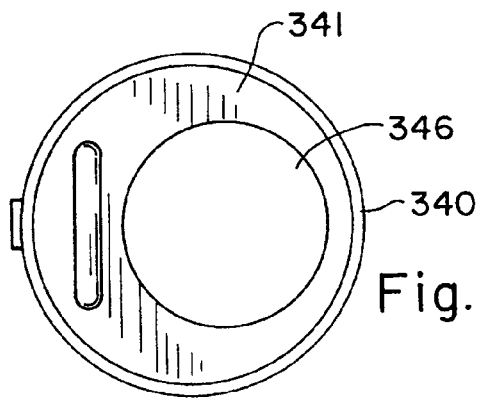
FIG. 31 is an end view of the housing.

Further variations can be used for the installation of carrier 54 and flapper door 50 in inlet 24 of housing 30. As described previously, one or more edge element 72 is received in a channel 44 for securing carrier 54 within housing 30. In accordance with another aspect of the present invention, a housing 340 (FIG. 27) is provided with an end 341 defining an annular rim 342 having an annular groove 344 on the outer surface thereof, with rim 342 being the opening defining housing inlet 346. Groove 344 can be formed through cutting, rolling or coining on the outside surface of annular rim 342. In an advantageous method for manufacturing, a deep draw stamping process can be used to form the housing. A groove can be coined in the flat material prior to piercing and extruding operations used to form the housing and rim 342. The end result is an annular groove in the OD of the cylinder formed by the piercing and extruding operations. It should be noted that housing 340 can be of one-piece construction similar to housing 30, or can be of other construction, such as, for example, outer housing component 304 or outer housing component 328 of a two-piece construction.

Figure 32:
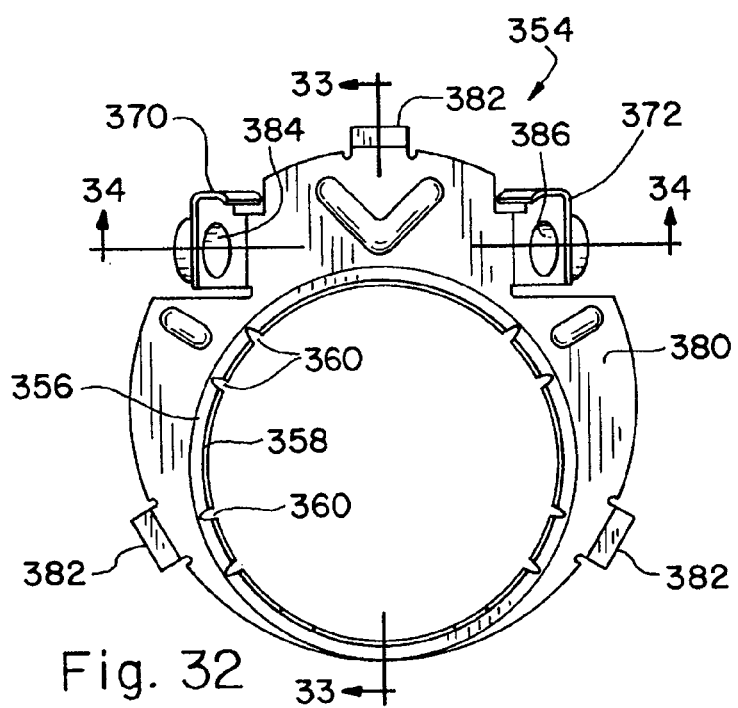
FIG. 32 is a plan view of the carrier.
Figure 33:
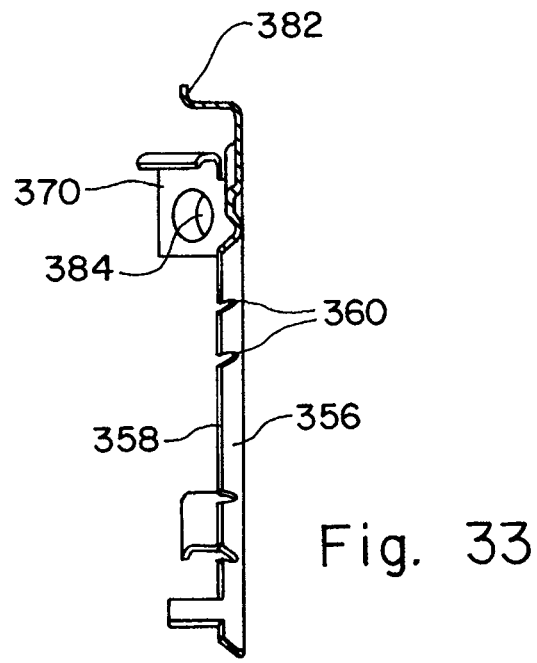
FIG. 33 is a cross-sectional view of the carrier shown in FIG. 32, taken along line 33-33 of FIG. 32.
Figure 34:
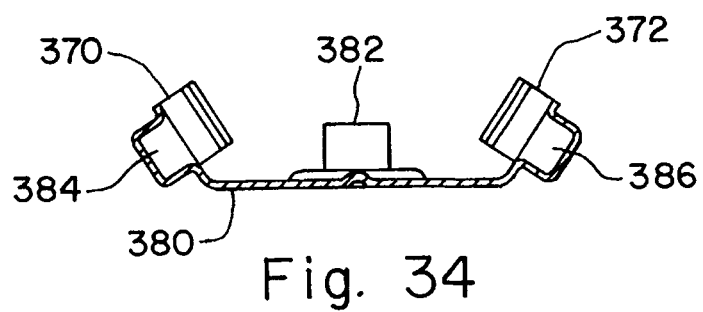
FIG. 34 is a cross-sectional view of the carrier shown in FIG. 32, taken along line 34-34 of FIG. 32.

A carrier 354, best seen in FIG. 32, is provided with a ring 356 to slide over rim 342. Ring 356 is angled inwardly slightly from the base thereof to a distal edge 358 thereof. Ring 356 is provided with one or more slits 360 extending inwardly from distal edge 358. In the exemplary embodiment shown, slits 360 are substantially axially oriented in ring 356, but can be oriented otherwise as well. Slits 360 allow portions of ring 356 between slits 360 to bend or deflect outwardly slightly as ring 356 is pressed over rim 342, thereby facilitating assembly. Distal edge 358 is received in groove 344 as carrier 354 reaches the final installed location. The angular, spring-like orientation of ring 356 inhibits outward deflection required to dislodge distal edge 358 from groove 344. Accordingly, distal edge 358 remains securely positioned within groove 344.

During assembly, a flapper door 361 and spring 362 are assembled to carrier 354 and to a pivot rod configuration 364 of flapper door 361. Spring ends 366, 368 engage carrier arms 370, 372, with pivot rod configuration 364 extending through coiled segments 374, 376 of spring 362, as well as into carrier arms 370, 372. Spring 362 is merely exemplary, and other types of biasing elements, including but not limited to those described previously herein can be used. A seal, such as those described previously herein for similar purposes, is inserted into annular rim 342 to provide a sealing engagement against flapper door 361 in the completed assembly. Alternatively, as described previously, a seal can be installed on the flapper door. Carrier 354 is positioned with ring 356 aligned with rim 342, and carrier 354 is pressed over rim 342 such that ring 356 slides along the outside surface of rim 342. The diameter defined by distal edge 358 is slightly smaller than the outside diameter of rim 342 such that the segments of ring 356 adjacent and between slits 360 are forced to deflect outwardly during assembly. As distal edge 358 encounters and settles into groove 344 on the outer surface of rim 342, the segments of ring 356 rebound inwardly, securing distal edge 358 in groove 344.

Other features and structures of carrier 354 can be similar to those described previously herein. For example, carrier 354 can include a plate-like body 380 that can be made of metal advantageously and defines ring 356. Legs 382 from body 380 can be provided about the perimeter of body 380 and are shaped, sized and configured to be received in a channel such as channel 44 described previously herein for securing carrier 354 within a housing. In the exemplary embodiment, three legs 382 are shown; however, more than three legs 382 or fewer than three legs 382 also can be used. Carrier arms 370, 372 define cup-like cavities 384, 386, respectively, for pivotally holding the end portions of pivot rod configuration 364 of flapper door 361, as described previously.

In the exemplary embodiment shown, groove 344 is continuous and surrounds rim 342, and ring 356 is substantially continuous except for the interruptions formed by slits 360. Formed in this manner, a substantially secure connection is formed between the carrier and the housing when the ring 356 is placed over rim 342. However, it should be understood that groove 344 also can be formed as a plurality of discrete groove segments and ring 356 can be discrete, smaller ring segments located for engaging the groove segments.

The configurations just described provide an easy-on, hard-off retention feature in that the ring is more easily deflected as required for installation than for removal. Removal of the carrier requires deformation of the carrier, and the carrier therefore is secured in an installed position. Using legs 382 at the outer edge of carrier 354 for engaging a housing together with ring 356 also of carrier 354 engaging rim 342 of the housing provides redundant connections of the carrier to the housing. Accordingly, the carrier is positioned securely in the housing.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fuel shut-off valve assembly comprising:
    a housing including an inner housing component defining an outlet for attachment to a fuel system and an outer housing component defining an axial inlet with an opening for receiving a fuel filler nozzle therein;
    a flapper door in said outer housing component movable with respect to said housing for opening and closing said inlet;
    said inner housing component and said outer housing component being made of different materials and connected one to the other;
    wherein said outer housing component defining an annular rim having an inner wall section radially spaced apart from an outer wall section, said inner wall section having an inner face and an outer face opposite the inner face, said inner wall section defining said axial inlet with respect to the inner face, and an annular groove on the outer face of said inner wall section, said annular rim defining said axial inlet;
    a carrier having a ring surrounding said annular rim, said carrier pivotally carrying said flapper door; and
    said ring having a distal edge disposed in said annular groove.

2. The fuel shutoff valve assembly of claim 1, one of said housing components defining a flange and the other of said housing components defining a collar formed around said flange for securing said inner and outer housing components together.

3. The fuel shut-off valve assembly of claim 2, said flange being defined on said inner housing component and said collar being defined on said outer housing component.

4. The fuel shut-off valve assembly of claim 2, said flange being defined on said outer housing component and said collar being defined on said inner housing component.

5. The fuel shut-off valve assembly of claim 2, said collar defining a shoulder, and a seal being disposed between said shoulder and said flange.

6. The fuel shut-off valve assembly of claim 1, said inner housing component including a surface coating on an inner surface thereof.

7. The fuel shut-off valve assembly of claim 6, said inner housing component defining an outwardly extending flange and said outer housing component defining a collar deformed around said flange.

8. The fuel shut-off valve assembly of claim 1, said outer housing component being of corrosion resistant material; and said inner housing component having a corrosion resistant coating thereon.

9. The fuel shut-off valve assembly of claim 1, said ring being inwardly angled from a base thereof to said distal edge.

10. The fuel shut-off valve assembly of claim 9, said ring having at least one slit therein extending inwardly from said distal edge whereby at least a portion of said ring is deflectable.

11. A fuel shut-off valve assembly comprising:
    a housing including an inner housing component defining an outlet for attachment to a fuel system, and an outer housing component defining an axial opening for receiving a fuel filler nozzle therein;
    a door in said outer housing component movable with respect to said housing for opening and closing said opening;
    one of said inner housing component and said outer housing component defining a flange, and the other of said inner housing component and said outer housing component defining a collar formed around said flange for securing said inner and outer housing components together,
    wherein said outer housing component defining an annular rim having an inner wall section radially spaced apart from an outer wall section, said inner wall section having an inner face and an outer face opposite said inner face, said inner wall section defining an axial inlet with respect to said inner face, and an annular groove on the outer face of said inner wall section, said annular rim defining said axial opening;
    a carrier having a ring surrounding said annular rim, said carrier carrying said door; and
    said ring having a distal edge disposed in said annular groove.

12. The fuel shutoff valve assembly of claim 11, said inner housing component and said outer housing component being formed of different materials.

13. The fuel shut-off valve assembly of claim 11, said flange being defined on said inner housing component and said collar being defined on said outer housing component.

14. The fuel shut-off valve assembly of claim 11, said flange being defined on said outer housing component and said collar being defined on said inner housing component.

15. The fuel shut-off valve assembly of claim 11, said collar defining a shoulder, and a seal being disposed between said shoulder and said flange.

16. The fuel shut-off valve assembly of claim 11, said inner housing component including a corrosion resistant coating on an inner surface thereof.

17. The fuel shut-off valve assembly of claim 11, said ring being inwardly angled from a base thereof to said distal edge.

18. The fuel shut-off valve assembly of claim 17, said ring having at least one slit therein extending inwardly from said distal edge whereby at least a portion of said ring adjacent said at least one slit is deflectable.

* * * * *

UNITED STATES PATENT AND TRADEMARK OFFICE
CERTIFICATE OF CORRECTION

PATENT NO. : 8,651,151 B2  
APPLICATION NO. : 12/593078  
DATED : February 18, 2014  
INVENTOR(S) : William Berghorst et al.

Page 1 of 1

It is certified that error appears in the above-identified patent and that said Letters Patent is hereby corrected as shown below:

On the title page, correct the filing date of the fourth provisional application in the Related U.S. Application Data (60) as follows:

(60) Provisional application No. 60/920,615 filed on Mar. 29, 2007, provisional application No. 60/528,037, filed on Dec. 9, 2003, provisional application No. 60/557,182 filed on Mar. 29, 2004, provisional application No. 60/582,380 filed on Jun. 23, 2004.

Signed and Sealed this
Nineteenth Day of August, 2014

Michelle K. Lee
*Deputy Director of the United States Patent and Trademark Office*